US011288339B1

(12) United States Patent
Hochman

(10) Patent No.: US 11,288,339 B1
(45) Date of Patent: Mar. 29, 2022

(54) SYSTEMS AND METHODS FOR RATIONAL FUNCTION FITTING IN MODEL GENERATION

(71) Applicant: Ansys, Inc., Canonsburg, PA (US)

(72) Inventor: Amit Hochman, Somerville, MA (US)

(73) Assignee: Ansys, Inc., Canonsburg, PA (US)

( * ) Notice: Subject to any disclaimer, the term of this patent is extended or adjusted under 35 U.S.C. 154(b) by 501 days.

(21) Appl. No.: 16/043,377

(22) Filed: Jul. 24, 2018

Related U.S. Application Data

(60) Provisional application No. 62/536,564, filed on Jul. 25, 2017.

(51) Int. Cl.
*G06F 17/17* (2006.01)
*G06F 30/20* (2020.01)
*G06F 111/10* (2020.01)

(52) U.S. Cl.
CPC ............. *G06F 17/17* (2013.01); *G06F 30/20* (2020.01); *G06F 2111/10* (2020.01)

(58) Field of Classification Search
CPC ...... G06F 17/17; G06F 30/20; G06F 2111/10; G16Z 99/00; G16F 99/00
USPC ........................................................... 703/2
See application file for complete search history.

(56) References Cited

U.S. PATENT DOCUMENTS

| 8,504,345 | B1 * | 8/2013 | Tsuk ...................... | G06F 30/30 703/14 |
| 9,477,792 | B1 * | 10/2016 | Tsuk ...................... | G06F 30/13 |
| 9,672,318 | B2 * | 6/2017 | Moisiadis ............. | G06F 30/327 |

OTHER PUBLICATIONS

Y. Nakatsukasa et al., "The AAA Algorithm for Rational Approximation," arXiv preprint arXiv: 1612.00337, 2016, published as Y. Nakatsukasa et al. "The AAA Algorithm for Rational Approximation". Siam J. Sci. Comput., 40-3 (2018),pp. A1494-A1522 (Year: 2016).*

Dhaene, Tom et al. "Efficient Algorithm for Passivity Enforcement of S-Parameter-Based Macromodels". IEEE Transactions on Microwave Theory and Techniques, vol. 57, No. 2, Feb. 2009 (Year: 2009).*

Seeger, Matthias "Low Rank Updates for the Cholesky Decomposition", Unversity of California at Berkeley (Year: 2008).*

Arnaut, L. R. "Time-domain versus frequency-domain computation of spatial correlation functions for near-field measurements." Asia-Pacific International Symposium and Exhibition on Electromagnetic Compatibility: APEMC 2013. Engineers Australia, 2013. pp. 1-4. (Year: 2013).*

(Continued)

*Primary Examiner* — Brian S Cook
*Assistant Examiner* — John E Johansen
(74) *Attorney, Agent, or Firm* — Jones Day

(57) ABSTRACT

Systems and methods are provided for generating a state space model of a physical system. Embodiments of a computer-implemented system may include a physical system data structure that includes frequency-domain response data that is indicative of a response of one or more components of a physical system to a stimulus, and a state space model generation engine that is configured generate a state space model based on the frequency-domain response data, where the state space model is usable to simulate a time-domain response of the one or more components of the physical system.

20 Claims, 7 Drawing Sheets

(56) References Cited

OTHER PUBLICATIONS

Neumayer, R., et al. "Synthesis of SPICE-compatible broadband electrical models from n-port scattering parameter data." 2002 IEEE International Symposium on Electromagnetic Compatibility. vol. 1. IEEE, 2002. pp. 469-474. (Year: 2002).*
Olivadese, Salvatore Bernardo, Stefano Grivet-Talocia, and Pietro Brenner. "Noise compliant macromodel synthesis for RF and Mixed-Signal applications." 2013 IEEE 22nd Conference on Electrical Performance of Electronic Packaging and Systems. IEEE, 2013. pp. 129-132. (Year: 2013).*
Nakatsukasa, Yuji, Sete, Olivier, Trefethen, Lloyd; The AAA Algorithm for Rational Approximation; arXiv: 1612 00337; 2016.
Higham, Nicholas; Estimating the Matrix p-norm; Numerische Mathematik; 62(1); pp. 539-555; 1992.
Boyd, David; The Power Method for Ip Norms; Linear Algebra and Its Applications, 9; pp. 95-101; 1974.
Dongarra, J., Moler, C Bunch, J., Stewart, G.; Linpack Users' Guide; Society for Industrial and Applied Mathematics; 1979.
Elden, L., Park, H.; Block Downdating of Least Squares Solutions; SIAM Journal on Matrix Analysis and Applications, 15(3); pp. 1018-1034; 1994.
Liu, Qiaohua; Modified Gram-Schmidt-Based Methods for Block Downdating the Cholesky Factorization; Journal of Computational and Applied Mathematics, 235(8); pp. 1897-1905; 2011.
Lawrence, Piers; Eigenvalue Methods for Interpolation Bases, Ph.D. Dissertation; The University of Western Ontario; 2013.
Eidelman, Yuli, GEMIGNANI, Luca, Gohberg, Israel; Efficient Eigenvalue Computation for Quasiseperable Hermitian Matrices Under Low Rank Perturbations; Numerical Algorithms, 47(3); pp. 253-273; 2008.
Aurentz, Jared, Vandebril, Raf, Watkins, David; Fast Computation of Eigenvalues of Companion, Comrade, and Related Matrices; BIT Numerical Mathematics, 54(1); pp. 7-30; 2014.
Vandebril, Raf, Del Corso, Gianna; An Implicit Multishift QR-Algorithm for Hermitian Plus Low Rank Matrices; SIAM Journal on Scientific Computing, 32(4); pp. 2190-2212; 2010.
Gustavsen, Bjorn, Semlyen, Adam; Rational Approximation of Frequency Domain Responses by Vector Fitting; IEEE Transactions on Power Delivery, 14(3); pp. 1052-1061; Jul. 1999.
Antoulas, A.C., Anderson, B.D.Q.; On the Scalar Rational Interpolation Problem; IMA Journal of Mathematical Control & Information, 3(2-3); pp. 61-88; 1986.
Lefteriu, Sandra, Antoulas, Athanasios; A New Approach to Modeling Multiport Systems From Frequency-Domain Data; IEEE Transactions on Computer-Aided Design of Integrated Circuits and Systems, 29(1); pp. 14-27; Jan. 2010.
Kabir, Muhammad, Khazaka, Roni; Macromodeling of Distributed Networks from Frequency Domain Data Using the Loewner Matrix Approach; IEEE Transactions on Microwave Theory and Techniques, 60(12); pp. 3927-3938; 2012.
Hochman, Amit; Fast Singular-Value Decomposition of Loewner Matrices for State-Space Macromodeling; IEEE 24th Conference on Electrical Performance of Electronic Packaging and Systems (EPEPS); pp. 177-180; Oct. 2015.
Lefteriu, Sanda, Grivet-Talocia, Stefano; Loewner-Based Macromodeling With Exact Interpolation Constraints; IEEE 25th Conference on Electrical Performance of Electronic Packaging and Systems (EPEPS); pp. 43-46; Oct. 2016.
Corless, Robert; Generalized Companion Matrices in the Lagrange Basis; Proceedings of EACA; Santander, Spain; pp. 317-322; 2004.
Foster, Leslie, Davis, Timothy; Algorithm 933: Reliable Calculation of Numerical Rank, Null Space Bases, Pseudoinverse Solutions and Basic Solutions Using SuiteSparseQR; ACM Transactions on Mathematical Software, 40(1); pp. 1-36; Sep. 2013.
Francis, J.G.F.; The QR Transformation: A Unitary Analogue to the LR Transformation—Part 1; The Computer Journal, 4(3); pp. 265-271; 1961.
Filip, Silviu-loan; Nakatsukasa, Yuji, Trefethen, Lloyd, Beckermann, Bernhard; Rational Minimax Approximation Via Adaptive Barycentric Representations; ArXiv:1705.10132; 2018.

* cited by examiner

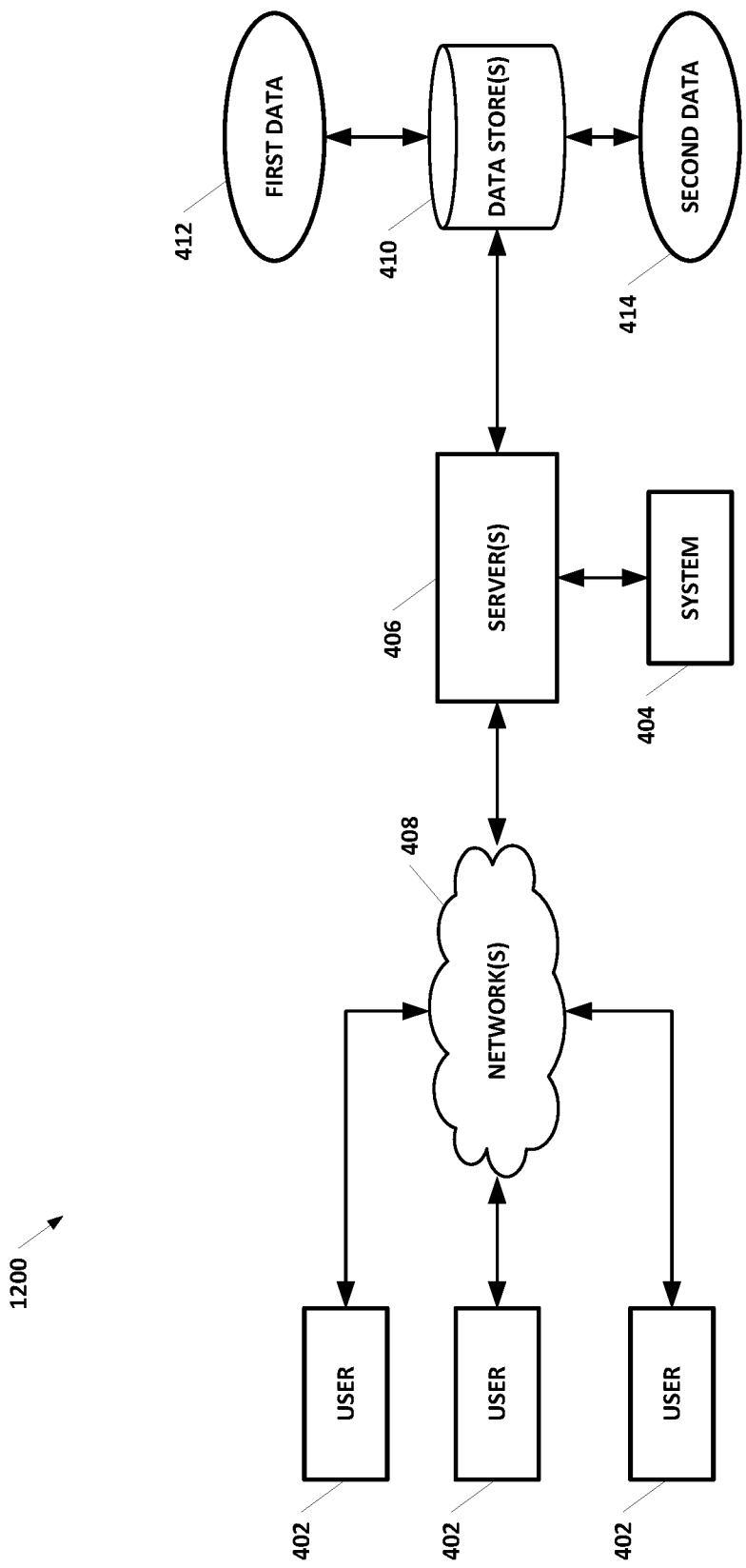

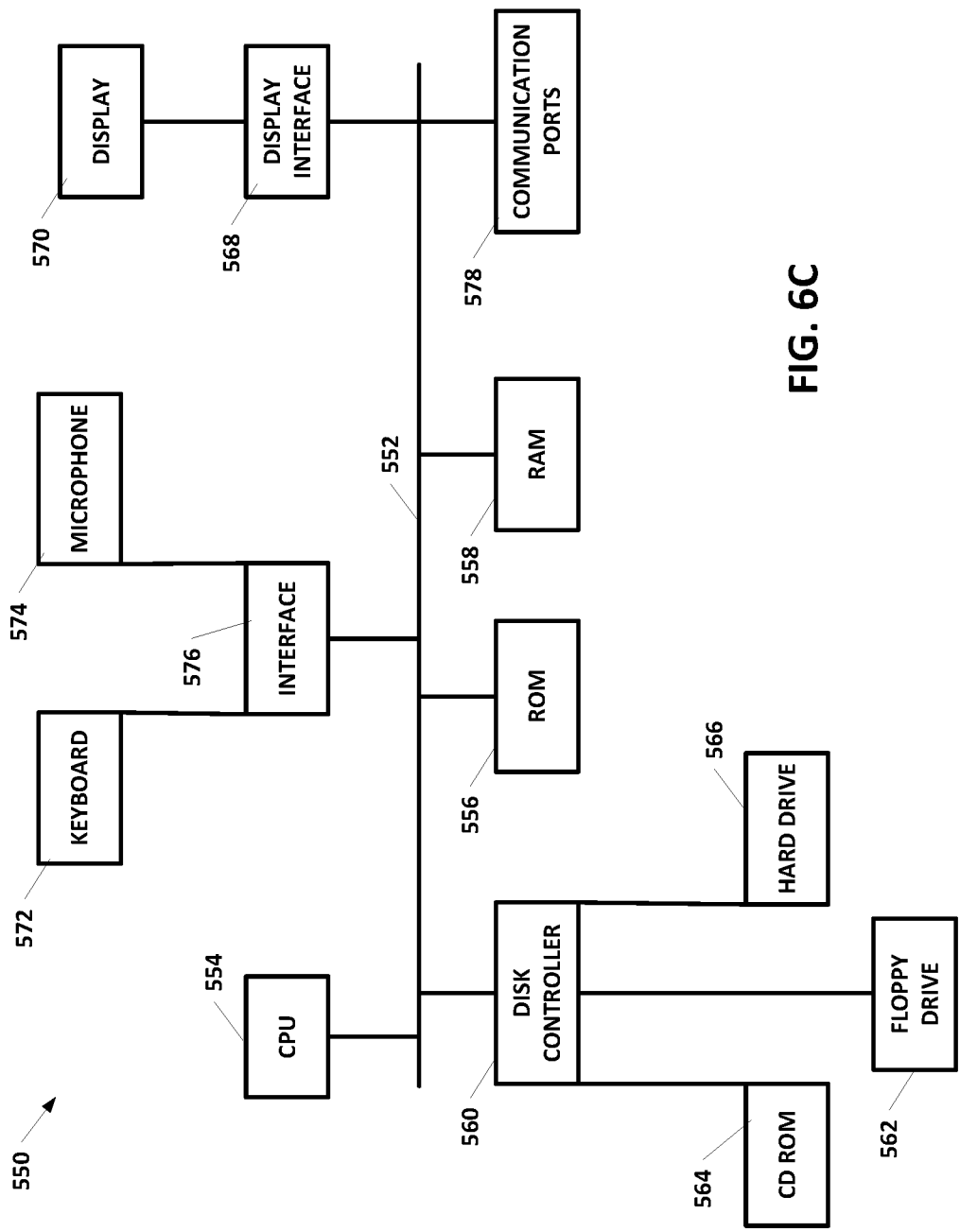

SYSTEMS AND METHODS FOR RATIONAL FUNCTION FITTING IN MODEL GENERATION

CROSS-REFERENCE TO RELATED APPLICATION

This application claims priority to U.S. Provisional Application No. 62/536,564, titled "FASTFIT: A Fast Algorithm for Rational-Function Fitting," filed on Jul. 25, 2017, the entirety of which is incorporated herein by reference.

TECHNICAL FIELD

The technology described herein relates generally to computer-aided design (CAD) tools and more particularly to systems and methods for generating a state space model based on rational function approximations.

BACKGROUND

Models of a physical system, such as a state space model, are useful for predicting real-world behaviors of that system. Using such models, inputs to the system or the system itself may be varied to simulate a wide variety of behaviors quickly, without requiring building or testing of the actual physical system itself. Model accuracy is often of high importance, as confidence that the model behaves substantially similarly to the physical system provides confidence in the simulation results. Oftentimes, techniques to generate an accurate model are significantly and sometimes prohibitively time consuming.

BRIEF DESCRIPTION OF THE FIGURES

FIGS. 5, 6A, 6B and 6C depict example systems that may be used to implement the technology disclosed herein.

DETAILED DESCRIPTION

Rational function approximations are particularly useful for modeling any system that exhibits sharp resonances, such as filters, waveguides, and other radio-frequency (RF) devices. Rational function approximations are also useful for extrapolating from data known only on a limited range, a problem for which polynomial fits are quite useless.

One example application for rational function approximation is generating time-domain models of systems for which only frequency-domain data is available. For example, in high-speed digital circuits, it is important to model the effect of interconnects on circuit performance. This is typically done by, first, measuring or performing an electromagnetic analysis of the interconnect, in the frequency-domain. Then, a time-domain model that matches the frequency domain data is constructed, and this model can be used to simulate the circuit while including the effects of the interconnect. Similarly, RF devices, such as antennas, filters, etc., are best analyzed in the frequency domain. To include the effect of such devices in a system simulation, a time-domain model needs to be constructed from the frequency-domain data. In these examples, models based on rational function approximations are widely considered the best practice.

Compared to state-of the art methods, the technology disclosed herein provides a much faster way to generate accurate state-space models of a physical system by reducing the number of time-consuming operations that a computer must carry out. Such a speed-up is of significant practical importance, as it allows the computation of larger models or many smaller models in a reasonable amount of time. This enables, for example, simulation and design of electronic circuits in situations where the current state of the art is too slow to be practical.

Figure 1:
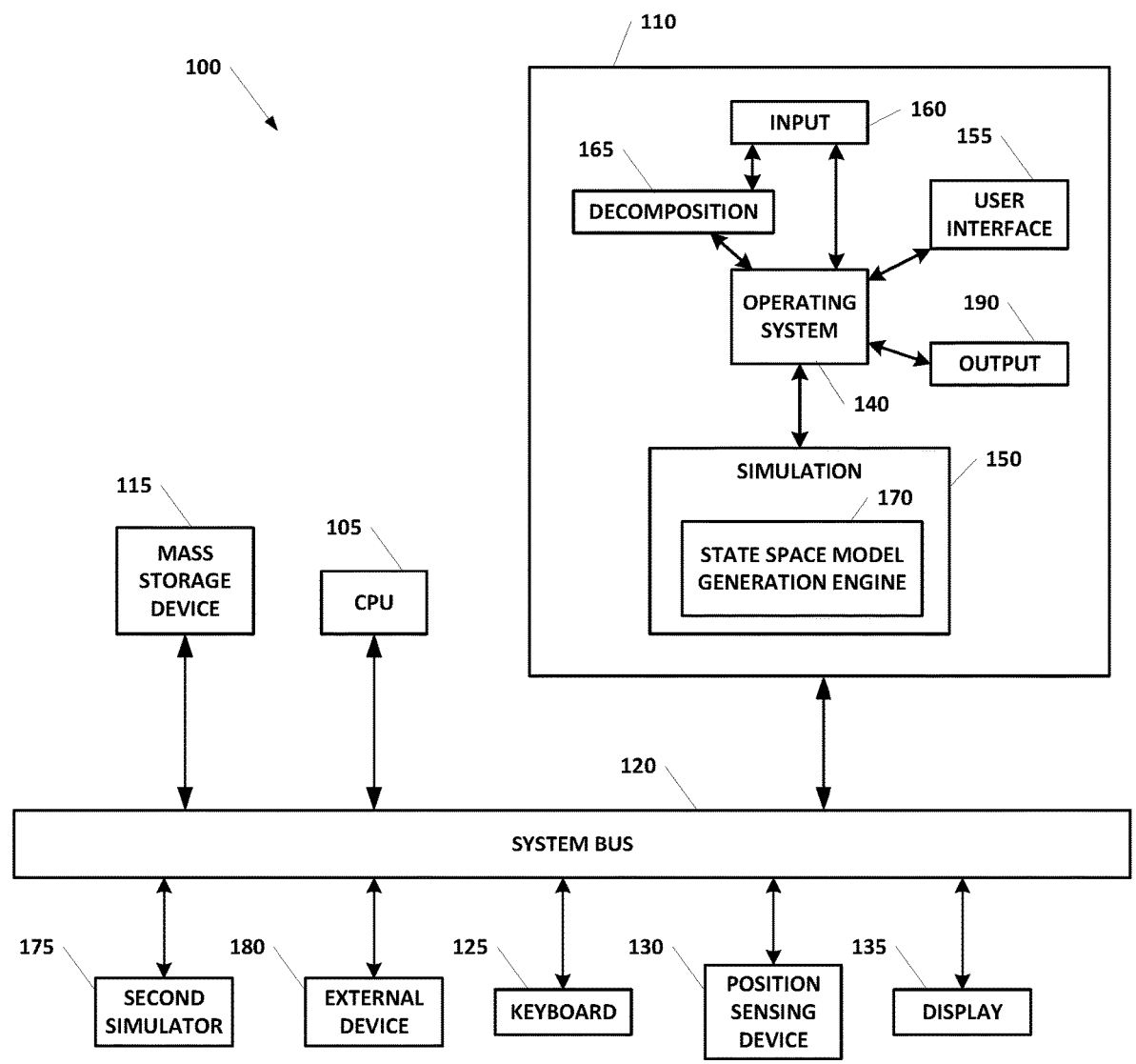
FIG. 1 is a block diagram of an example simulation system.

FIG. 1 is a block diagram of an example simulation system 100 that includes a state space model generation engine 170 for generating a state space model based on rational function approximations. The example simulation system 100 includes a central-processing unit (CPU) 105, a main memory 110, and one or more mass storage devices 115, all coupled to a system bus 120 over which components of the system communicate. CPU 105 directs the operation of the example simulation system 100 using a keyboard 125 and/or a position-sensing device (e.g., a mouse or trackball) 130. The output of either device may be used to designate information or select particular areas of a display 135 to direct functions to be performed by the simulation system 100.

The main memory 110 contains a group of software modules that control the operation of the CPU 105 and its interaction with other hardware components. An operating system 140 directs the execution of low-level, basic system functions such as memory allocation, file management, and operation of mass storage devices 115. At a higher level, a simulation module 150 directs execution of the functions performed to generate simulation models. More particularly, the simulation module 150 in the illustrated example includes a state space model generation engine 170 which executes functions, as described in more detail below, to generate a state space model based on rational function approximations.

A user interface module 155 enables interaction with the example simulation system 100, for example using a display 135. An input module 160 accepts input data for simulation, e.g., from the mass storage device 115, keyboard 125, positioning-sensing device 130, and/or an external source. The input data may, for example, include digitized information corresponding to the system to be simulated, such as an electrical circuit or other physical system. For example, the input data may be digital values representing signal levels at terminals of an electronic circuit. Generally, the input data will be a representation of the system in the frequency domain. A decomposition module 165 converts such input data into a set of s-parameters for further processing (as described below) using known techniques. See, e.g., B. Young, Digital Signal Integrity: Modeling and Simulation with Interconnects and Packages, Prentice Hall (2000). In embodiments, the input module 160 may alternatively accept a set of s-parameters as input data from an external source, obviating the need for processing by the decomposition module 165.

An output module 190 directs output data from the simulation module 150 to, e.g., a mass storage device 115 for storage, a display 135 for presentation, a second simulator 175 for further analysis and/or simulation, and/or an external device 180 (e.g., as a control signal to an electronic device.)

Figure 2:
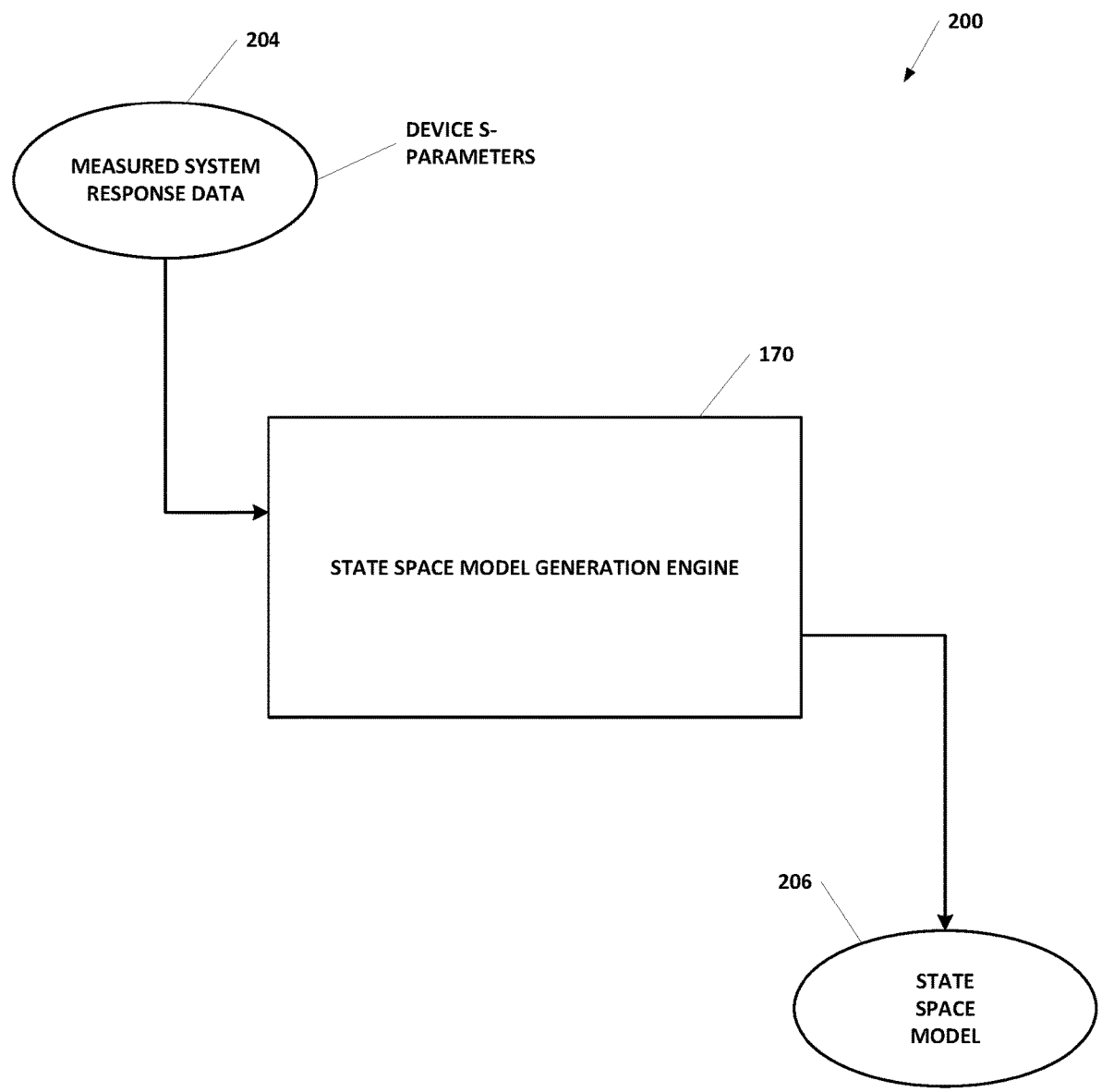
FIG. 2 is a block diagram showing an example operation of a state space model generation engine.

FIG. 2 is a block diagram 200 showing an example operation of a state space model generation engine 170. The state space model generation system 170 receives input data 204 indicative of a physical system to be modeled. In one example, the state space model generation engine 170 receives measured system response data 204 extracted from tests or simulation of the physical system. In one embodiment, the measured system response data 204 is s-parameter data extracted from a multi-port electronic device, where the s-parameter data indicates port-to-port responses to the application of signals at different frequencies to different ports of the electronic device. The input data 204 may, for example, be included in a physical system data structure that is stored on a non-transitory computer-readable medium. The input data 204 is utilized by the state space model generation engine 170 to generate a state space model 206 of the system that can be used to simulate behavior of the physical system, such as via a system-level time-domain simulation.

Certain methods of generating a state space model of a physical system, for example, vector fitting (VF), can produce a model in an acceptable period of time, if the order of the model is known in advance. However, in real-world applications, the order is not known in advance, and therefore, models of increasing order must be computed until an accurate model is found. Other model generation algorithms (e.g., Löwner-matrix based algorithms) include an estimate of the appropriate order, but are generally more expensive in terms of time and processing resources than VF. The Löwner-matrix based algorithms are also more robust, because they do not have the convergence problems that VF occasionally exhibits.

A new method has recently been developed for constructing rational-function approximations, referred to as the "Adaptive Antoulas-Anderson" (AAA) algorithm. See, Y. Nakatsukasa, et al., The AAA Algorithm for Rational Approximation, arXiv: 1612.00337 (2016). While the AAA algorithm has several appealing properties, it is also based on the Löwner matrix and it therefore inherits the robustness associated with these methods. Also, the AAA algorithm generates models of increasing orders until an adequate model order is found. However, the AAA algorithm is a general rational approximation method and is not directly applicable to the generation of state-space time-domain models. The reason is that while any state-space model is characterized by a rational function, not every rational function characterizes a valid state-space model. Certain constraints must be enforced on the rational function to make it suitable for generation of time-domain models, and the rational functions computed with AAA generally do not obey these constraints.

With reference again to FIG. 2, the state space model generation engine 170 utilizes a model generation operation, referred to herein as "FASTFIT." The FASTFIT model generation process is based on the AAA algorithm, but modifies and extends the AAA technique to provide a fast and effective mechanism for generating a state space model 206. Following below is a description of the AAA algorithm, followed by a description of the FASTFIT model generation operation utilized by the state space model generation engine 170.

The AAA Algorithm

The inputs to the AAA algorithm are N sampling points, $s \in C^N$, and corresponding data, $f \in C^N$. The output is a rational function in barycentric form, $$r(s) = \sum_{i=1}^{n} \frac{w_i \hat{f}_i}{s - \hat{s}_i} / \sum_{i=1}^{n} \frac{w_i}{s - \hat{s}_i}, \quad (1)$$

where the S' for i=1, 2, ..., n, are a subset of the $s_i$, and the $\hat{f}_i$ are the corresponding data. For any choice of non-zero weights $w_i$, we have $r(\hat{s}_i)=\hat{f}_i$, i.e., r(s) is an interpolant with nodes $\hat{s}_i$. An interpolant with n nodes has n poles, which can be computed from knowledge of $w_i$ and $\hat{s}_i$. The algorithm begins with a single node, for example the one for which $|f_i|$ is largest, and proceeds iteratively, adding a new node at each step. At iteration n, there are n nodes, and the rest of the sampling points are denoted by $\tilde{s}_j$, for j=1, 2, ..., N-n. The approximation error is zero at $\hat{s}_i$, and at $\tilde{s}_i$ the approximation error is:

$$\epsilon_j = \left| \tilde{f}_j - \sum_{i=1}^{n} \frac{w_i \hat{f}_i}{\tilde{s}_j - \hat{s}_i} / \sum_{i=1}^{n} \frac{w_i}{\tilde{s}_j - \hat{s}_i} \right|, j = 1, 2, \ldots, N-n \quad (2)$$

Multiplying on both sides by the denominator in absolute value, a linearized error is obtained:

$$\varepsilon_j \equiv \epsilon_j \left| \sum_{i=1}^{n} \frac{w_i}{\tilde{s}_j - \hat{s}_i} \right| = \left| \sum_{i=1}^{n} \frac{(\tilde{f}_j - \hat{f}_i) w_i}{\tilde{s}_j - \hat{s}_i} \right|, j = 1, 2, \ldots, N-n. \quad (3)$$

The 2-norm of the error can be written using a Löwner matrix, $L \in \mathbb{C}^{(N-n) \times n}$, as:

$$\|\varepsilon\|_2 = \|Lw\|_2, \quad (4)$$

where, $$L_{ji} = \frac{\tilde{f}_j - \hat{f}_i}{\tilde{s}_j - \hat{s}_i}. \quad (5)$$

From equation (4), it is clear that the error is zero if L has a nontrivial null space. The AAA algorithm sets w as the solution of:

$$\min \|Lw\|_2, \|w\|_2 = 1, \quad (6)$$

obtained by computing a singular-value decomposition (SVD) of L and setting w to the right singular vector corresponding to the smallest singular value. Once w has been computed for a set of nodes, the next node is chosen as the node for which the non-linearized error, $\epsilon_i$, is largest. As more interpolation points are added, $\max|\epsilon|$ generally decreases, though not always monotonically. Zero error will result once n>N/2 since then the number of columns of L exceeds the number of rows, but the algorithm can usually be stopped much earlier, once the error is smaller than some tolerance.

Like Vector Fitting (VF), the AAA algorithm computes the weights by minimizing the 2-norm of the linearized error, $\|\varepsilon\|_2$. In VF, this minimization is re-weighted on each iteration, so as to cancel the effect of the multiplication by the denominator of the rational function. In the AAA algorithm, this is avoided and instead the choice of interpolation nodes controls the approximation error.

Other Löwner matrix based methods obtain the approximation from a low-rank approximation of the Löwner matrix, i.e., from the singular vectors corresponding to the large singular values. In the AAA algorithm, the right singular vector corresponding to the smallest singular value is used. A rational interpolant exists if the Löwner matrix is rank-deficient. This means that if an n-pole rational interpolant exists, the AAA algorithm will find one at the $n^{th}$ iteration, and stop.

FASTFIT State Space Model Generation (a) Ensuring Hermitian Symmetry

As mentioned above, the approximations generated by the AAA algorithm need to be constrained to be used as state-space models. One constraint is that the approximation obey a Hermitian symmetry condition, which ensures that the state-space model yields real, instead of complex, results.

Let us assume that the data points, $s_i$, are purely imaginary, that they come in complex conjugate pairs, $s_i = \bar{s}_{N+1-i}$, and that the data also obeys $f_i = \bar{f}_{N+1-i}$, Let us also assume, for the time being, that $s_i \neq 0$. The goal is to ensure that $\overline{r(s)} = r(\bar{s})$. If some point, $s_i$, is chosen as an interpolation node we have the mirror-image point as an interpolation node as well. Hence, if we choose $\hat{s}_j = s_i$, we add $\bar{s}_{j+1} = \bar{s}_{i+1}$ to the set of interpolation nodes. If we also had $\bar{w}_j = w_{j+1}$, then $\overline{r(s)} = r(\bar{s})$ would follow. To enforce this last requirement, we define a complex-to-real operator as follows, $$\mathcal{H}(A) = \begin{bmatrix} \mathcal{R}(A) & -\mathcal{J}(A) \\ \mathcal{J}(A) & \mathcal{R}(A) \end{bmatrix}, \quad (7)$$

which is used to define a real matrix, $L_H$, by applying $\mathcal{H}$ to columns of L. At iteration n, this matrix is:

$$L_H = [\mathcal{H}(l_1) \, \mathcal{H}(l_2) \, \ldots \, \mathcal{H}(l_{2n})], \quad (8)$$

where $l_i$ denotes the ith column of L, and on each iteration, two columns corresponding to conjugate data points are added. A solution to equation (6) can be determined from an SVD of $L_H$. Let $w_H$ denote the right singular vector corresponding to the smallest singular value of $L_H$. Then w that solves equation (6) is given by:

$$w = w_H(1:2:2n-1) + j w_H(2:2:2n), \quad (9)$$

where we have made use of Matlab-style indexing. To enforce $\bar{w}_j = w_{j+1}$, we restrict $w_H$ to be in the subspace of conjugate-symmetric weight vectors, i.e., $$w_H = H\tilde{w}_H, H = I_n \otimes \begin{bmatrix} 1 & \\ & 1 \\ & 1 \\ & -1 \end{bmatrix} \quad (10)$$

In equation (10), $I_n$ is the size-n identity matrix, and $\otimes$ denotes the Kronecker product. We can now find the coefficients $\tilde{w}_H$ from an SVD of $L_H H$, reconstruct $w_H = H\tilde{w}_H$, and set w according to equation (9). Note that the error vector, $|L_H H_{\tilde{w}}|$, is symmetric for any $\tilde{w}$, so we may dispense with the rows of $L_H$ corresponding to $s_i$ on the negative imaginary axis. After removing these rows, the matrix we need the SVD of is N/2×2n, and real.

If a data point exists at s=0, it is selected as the first sampling point. The weight assigned to this point must be real, so the second column of $\mathcal{H}(l_1)$ is removed. Also, H is replaced by diag(1,H), and equation (9) is replaced by:

$$w(1) = w_H(1), w(2:2n+1) = w_H(2:2:2n) + j w_H(3:2:2n+1). \quad (11)$$

(b) Ensuring Stability

As in other Löwner matrix based methods, the poles, $\lambda_i$, of the approximation need not be in the left half of the s plane. Poles in the right half are called unstable poles, and they lead to unstable time-domain models. A way to avoid this is to compute the poles, which are the eigenvalues of the following generalized eigenvalue problem (GEP) (X,Y), with $$X = \begin{bmatrix} 0 & -1 & -1 & \ldots & -1 \\ w_1 & s_1 & & & \\ w_2 & & s_2 & & \\ \vdots & & & \ddots & \\ w_n & & & & s_n \end{bmatrix}, Y = \begin{bmatrix} 0 & & & & \\ & 1 & & & \\ & & 1 & & \\ & & & \ddots & \\ & & & & 1 \end{bmatrix}, \quad (12)$$

and discard any unstable poles. Let us denote the number of stable poles by $n_{stable}$. The residue $c_i$ at pole $\lambda_i$ can be computed using L'Hôpital's rule, $$c_i \equiv \lim_{s \to \lambda_i} r(s) = -\sum_{i=1}^{n} \frac{w_i \hat{f}_i}{\lambda_i - \hat{s}_i} \bigg/ \sum_{i=1}^{n} \frac{w_i}{(\lambda_i - \hat{s}_i)^2}. \quad (13)$$

To complete a pole-residue representation, the constant term, d, is obtained by letting $s \to \infty$. Then, $$d = \lim_{s \to \infty} r(s) = \sum_{i=1}^{n} w_i \hat{f}_i \bigg/ \sum_{i=1}^{n} w_i. \quad (14)$$

Once this stable approximation is determined, it is evaluated at the data points, and if the approximation error is lower than the tolerance, the process stops. Below, it is explained how the poles can be computed in $O(n^2)$ operations, and the evaluation of the pole-residue representation requires O(Nn) operations. Nevertheless, as this check is relatively time-consuming, it can be applied when the error of the approximation that includes unstable poles is below the tolerance.

A state-space model is readily obtained from the stable pole-residue form. A state-space model is defined by four matrices, A, B, C, and D, that relate an input vector u, an output vector y, and a state vector x, using the following set of ordinary differential equations:

$$\frac{dx}{dt} = Ax + Bu, y = Cx + Du \quad (15)$$

This is a time-domain model (u, y, and x are functions of time), whereas the data is in the frequency domain. Transforming these equations to the frequency domain using the Laplace transform we find that a state-space model is characterized by a transfer function, $f(s)$, which is a rational function given by:

$$f(s)=C(sI-A)^{-1}B+D, \qquad (16)$$

where I is the identity matrix. By use of the FASTFIT method, a rational function that fits the measured frequency-domain data can be determined, and therefore a state-space model that has this rational function as its frequency-domain transfer function can be obtained, by relating the state-space matrices to the poles, residues and constant term, $$A=\text{diag}(\lambda_1,\lambda_2,\ldots,\lambda_{n_{stable}}), B=[1\ 1\ \ldots\ 1]^T,$$
$$C=[c_1,c_2,\ldots,c_{n_{stable}}], D=d. \qquad (17)$$

(c) Approximating Vector Data

The AAA algorithm may be extended for vector data, i.e., $f_i \in \mathbb{C}^P$. Of course, it is possible to just run the algorithm (possibly in parallel) for each entry separately. But in some applications, it is useful to have all entries of the vector r(s) use the same set of weights and interpolation nodes, or equivalently, the same set of poles. This is useful because it is then quicker to evaluate all of the entries of r(s). For example, to evaluate r(s) at some $s_k$ for k=1, 2, ..., K, the matrix $C \in \mathbb{C}^{K \times n}$ may be formed with $C_{ki}=w_i/(s_k-\hat{s}_i)$, and used as follows, $$Y=CF, X=\text{diag}(Cu), G=Y^{-1}X. \qquad (18)$$

In equation (18), $F \in \mathbb{C}^{N \times p}$ and $F_{il}$ is the l-th entry of $\hat{f}_i$, u is a vector of n ones, and $G \in \mathbb{C}^{N \times p}$ with $G_{kl}$ the l-th entry of $r(s_k)$. If each approximation has a different set of weights and interpolation nodes, this process is repeated for each entry of r(s). A new C matrix is formed for each entry and it is not possible to take advantage of BLAS-3 operations as in equation (18).

To determine approximations that share the same weights and interpolation nodes, the Löwner matrix of equation (5) is replaced with a block-Löwner analogue. Its size is now $p(N-n) \times n$. Otherwise, the algorithm remains virtually unchanged, except for the choice of interpolation nodes. A natural choice is to pick the data point i for which the norm off is largest.

The minimization problem in equation (6) is now interpreted as minimizing the sum of squared errors across all entries of the data and all $\tilde{s}_j$ sampling points. The number of columns of L remains unchanged, n, but the number of rows has increased by a factor of p. One might wonder whether convergence to an interpolant for all data samples and entries is still guaranteed. Each time a data point is chosen to be an interpolation node, p rows are removed from L, which means that if n is increased enough that n>Np/(p+1), the number of rows of L becomes smaller than the number of columns, and the error becomes zero.

(d) Accelerating AAA

On each iteration of AAA, the SVD of the Löwner matrix is computed, requiring O(NW) operations, and this is the main computational bottle-neck of the algorithm. To accelerate the AAA algorithm, we note that on each iteration we add one column, and remove one row, from the Löwner matrix; otherwise it is unaffected. It is well-known that the SVD is not very well-suited for updates such as these, but other decompositions are well-suited. For example, the ULV/URV decompositions were conceived precisely for this aim. We use the following alternative, which is somewhat simpler to implement.

Since the weight is a right singular vector of L, we compute and update R, the Cholesky factor of $L^H L$, which is an n×n matrix. We have $R^H R = L^H L$, so we can compute the weight as the right singular vector corresponding to the smallest singular value of R. As shown below, both the update and the computation of the weight vector can be done in $O(n^2)$ operations.

(e) Computing the Weight Vector from R

The weight vector is also the eigenvector corresponding to the smallest eigenvalue of RHR, so it can be computed by applying an inverse power iteration on this matrix. Computing a matrix-vector multiplication with $(RHR)^{-1}$ can be done in $O(n^2)$ by using two backward-substitution solves.

The number of iterations needed for convergence depends on the distance between the smallest eigenvalue and the one closest to it. As the process progresses, this distance tends to decrease, and the convergence rate decreases with it. It may be useful to use more than one vector, a scheme known as "simultaneous iteration" or "subspace iteration."

Even faster convergence can be achieved if the norm is changed in equation (6) from the 2-norm to the ∞-norm, i.e., we solve, $$\min \|Rw\|_\infty, \|w\|_\infty = 1. \qquad (19)$$

Equation (19) may, for example, be solved using the PNORM algorithm described in N. J. Higham, *Estimating the matrix p-norm*, Numerische Mathematik, vol. 62, no. 1, pp. 539-555 (1992), which is based on an 4 power iteration proposed and analyzed in D. W. Boyd, *The Power Method for lp Norms*, Linear Algebra and its Applications, vol. 9, pp. 95-101 (1974). Each power iteration requires two backward solves, just like the regular power iteration, and the PNORM algorithm usually needs two, and not more than three, iterations to solve equation (19) to high accuracy (e.g., set tolerance=$10^{-8}$).

(f) Updating R

In the first part of the update, some row of L is removed, such as the k-th row. The Hermitian transpose of this row is a column vector denoted by $l_k$. Define P to be the N-n identity matrix with the k-th column omitted, so that the $P^T L$ is the L matrix with the k-th row removed. We want the Cholesky factor of $L^H P P^T L$. Since $PP^T$ is the identity matrix with the k-th diagonal element set to zero, we have, $$L^H PP^T L = L^H L - l_k l_k^H = R^H R - l_k l_k^H = \tilde{R}^H \tilde{R}, \qquad (20)$$

where $\tilde{R}$ is the updated Cholesky factor to be computed. It can be seen that a rank one downdate of R needs to be computed. This is a standard problem in numerical linear algebra for which $O(n^2)$ algorithms exist and are available as part of LINPACK. See, G. H. Golub, et al., *Matrix Computations*, 4th edition, JHU Press (2012); J. Dongara, et al., *LINPACK Users' Guide*, Society for Industrial and Applied Mathematics (1971). If we are approximating several functions at once, and therefore need to remove several rows at once, a block-downdating algorithm can be used, such as described in L. Elden, et al., *Block Downdating of Least Squares Solutions*, SIAM Journal on Matrix Analysis and Applications, vol. 15, no. 3, pp. 1018-1034 (1994), and Q. Liu, *Modified Gram-Schmidt-Based Methods for Block Downdating the Cholesky Factorization*, Journal of Computational and Applied Mathematics, vol. 235, no. 8, pp. 1897-1905 (2011).

In the second part of the update a column is added to L, $$\tilde{L}=[L\ l], \qquad (21)$$

and the Cholesky factor is updated so that $\tilde{R}=\tilde{L}^H\tilde{L}$. To do this, the process needs to find $a \in \mathbb{C}^n$ and a scalar $b>0$ such that $$\begin{bmatrix} R^H & 0 \\ a^H & b \end{bmatrix}\begin{bmatrix} R & a \\ 0 & b \end{bmatrix} = \begin{bmatrix} R^H R & R^H a \\ a^H R & a^H a + |b|^2 \end{bmatrix} = \begin{bmatrix} L^H L & L^H l \\ l^H L & l^H l \end{bmatrix}. \quad (22)$$

The process computes a by a backward-substitution solve of $R^H a = L^H l$, and then sets $b=\sqrt{l^H l - a^H a}$. The matrix $R^H$ is invertible as long as L is not rank-deficient, which is the case as long as a perfect interpolant does not exist. If $R^H$ is too ill-conditioned, the weight may be computed using the SVD of L, though this only happens when the approximation is close to being an interpolant through all the data, and the process will generally stop much earlier to avoid overfitting. Hence, in the following description, it may be assumed that L is not rank-deficient. The constant b will be real and positive under this assumption. This follows from $$l^H l - a^H a = l^H (I - L(L^H L)) l > 0. \quad (23)$$

In equation (23), the process makes use of $I-L(L^H L)^{-1}L^H$ being positive definite, as can be shown by considering the Schur's complement of the positive definite matrix $[L,l]^H [L,l]$.

The computation of a requires O(Nn) operations to compute $L^H l$ and $O(n^2)$ for the backward-substitution solve. So, taking all steps into account, computing an order n approximation starting from n=1 takes $O(Nn^2)$ operations in total.

When ensuring Hermitian symmetry, the Cholesky factor of $L_H H$ needs to be updated, which on each iteration grows by two columns and shrinks by two rows. Deleting the two columns can be done sequentially or with a block-downdating algorithm. To add the two columns at once, the algorithm above can be generalized to handle any number of columns. The two-column matrix is added, $$L_R = [\mathcal{H}(l_+) \ \mathcal{H}(l_-)]\begin{bmatrix} 1 & \\ & 1 \\ 1 & \\ & -1 \end{bmatrix}, \quad (24)$$

where $l_\pm$ are columns of the complex Löwner matrix corresponding to two complex-conjugate data points. Then the updated Cholesky factor is given by, $$\tilde{R} = \begin{bmatrix} R & A \\ & B \end{bmatrix}, A = R^{-H} H^H L_R^H L_R, B = chol(L_R^H L_R - A^H A). \quad (25)$$

(g) Fast Computation of Poles

To enforce stability of the approximation, the poles are computed and the unstable poles are removed, which can increase the error dramatically. Therefore, doing this only as a post-processing phase is not practical, as there is no control over the final error of the stable approximation. It is preferable to compute the stable approximation on each iteration, and to use its error in the stopping criterion. The problem is that computing the poles by solving the GEP with matrices given in equation (12) requires $O(n^3)$ operations, which would slow down the algorithm to the original $O(Nn^3)$ cost. Fortunately, the GEP matrices are structured; they are defined by O(n) numbers, and methods for computing the eigenvalues in $O(n^2)$ operations exist.

A fast pole computation routine may be implemented, for example using the techniques described in P. W. Lawrence, *Eigenvalue Methods for Interpolation Bases*, Ph.D. Dissertation, The University of Western Ontario London (2013), and Y. Eidelman, et al., *Efficient Eigenvalue Computation for Quasiseperable Hermitian Matrices Under Low Rank Perturbations*, Numerical Algorithms, vol. 47, no. 3, pp. 253-273 (2008). First, the matrix A is transformed into an upper-Hessenberg matrix, using a series of Givens rotations. Then the infinite eigenvalues of the (A,B) pair are deflated, and the GEP is transformed into a regular eigenvalue problem. As long as the interpolation nodes are real, the matrix of this eigenvalue problem is an upper-Hessenberg matrix of the form $$X = F + uv^H \quad (26)$$

where F is Hermitian and u, $v \in \mathbb{C}^n$. Since the nodes are purely imaginary, they are multiplied by j and then the poles are divided by j.

Methods for computing eigenvalues of companion matrices and other structured matrices are known. See, e.g., J. L. Aurentz, et al., *Fast Computation of Eigenvalues of Companion, Comrade, and Related Matrices*, BIT Numerical Mathematics, vol. 54, no. 1, pp. 7-30 (2014); R. Vandebril, et al., *An Implicit Multishift QR Algorithm for Hermitial Plus Low Rank Matrices*, SIAM Journal on Scientific Computing, vol. 32, no. 4, pp. 2190-2212 (2010). In an embodiment, the disclosed process may use the method described in Y. Eidelman, et al., *Efficient Eigenvalue Computation for Quasiseparable Hermitian Matrices Under Low Rank Perturbations*, Numerical Algorithms, vol. 47, no. 3, pp. 253-273 (2008), which fits the class of matrices with the form of equation (26) and is simple to implement. To compute the eigenvalues, the classical QR algorithm is used, but the structure of the matrix is exploited to accelerate each iteration of the algorithm, resulting in an $O(n^2)$ computation time.

(h) Alternative Method for Error Computation

In one alternative embodiment, the error of the stable approximation may be determined as follows. First, the (potentially unstable) rational approximation is transformed using a bilinear mapping, $$s(z) = jw_0 \frac{1-z}{1+z}, w_0 = \max_i(|s_i|), \quad (27)$$

which maps the left-hand side of the complex s plane to the unit circle in the z plane. r (s(z)) is evaluated on a number of uniformly spaced points on the unit circle. Then, the Fast-Fourier Transform (FFT) is used to compute the coefficients in a Laurent series that interpolates r (s(z)) at these points. Lastly, by discarding the coefficients belonging to positive exponents in the series, the approximation is projected onto the space of stable rational functions. The process can begin with a small number of points, and increase their number until the magnitude of the Fourier coefficients is small enough. The decay rate is exponential, so this method is usually fast. However, if there are poles close to the unit circle, the decay rate can be quite slow. It is possible to limit the number of points used, and in this way to indirectly filter poles that are deemed too close to the unit circle. Computing the poles, as described in (g) above, is more robust, but for a quicker implementation, the FFT-based approach can be used.

Figure 3:
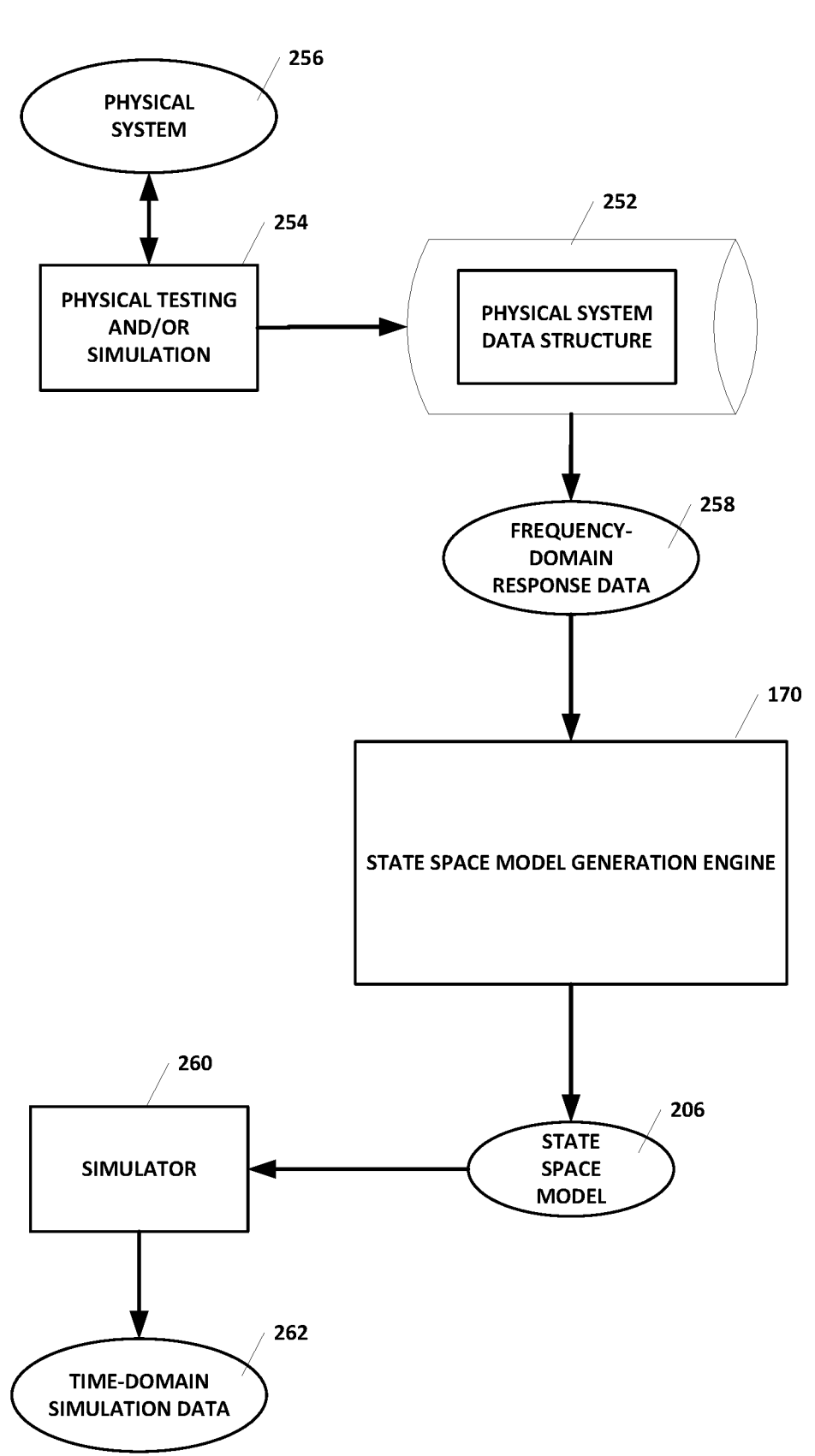
FIG. 3 is a block diagram showing an example application of the state space model generation engine.

To further illustrate the use of the disclosed FASTFIT process, an example application of a state space model generation engine 170 is illustrated in FIG. 3. The example system 250 shown in FIG. 3 includes a physical system data structure 252, stored in the one or more non-transitory computer-readable medium, that includes frequency-domain response data 258 that is indicative of a response of a physical system 256 to a stimulus. For example, one or more physical testing and/or computer simulation systems 254 may be used to extract the frequency-domain response data 258 from one or more components of the physical system 256. In one example, the physical system 256 may be a printed-circuit board that includes a connector to a PCIe bus. In this example, the scattering parameters (s-parameters) of the connector may be tabulated, for example at 3000 frequencies between 0 and 3 GHz, for inclusion in the frequency-domain response data 258.

The state space model generation engine 170 is configured to generate the state space model 206 using the FASTFIT model generation operation, as described above. In the illustrated example, the state space model 206 is received by a simulator 260, such as a SPICE-based circuit simulator, that is configured to use the state space model 206 to simulate a time-domain response 262 of one or more components of the physical system 256. For instance, again using the example of a printed-circuit board that includes a connector to a PCIe bus, the simulator 260 may be used to ascertain the effect of the connector on the electrical signals on the PCIe bus in the time domain.

Figure 4:
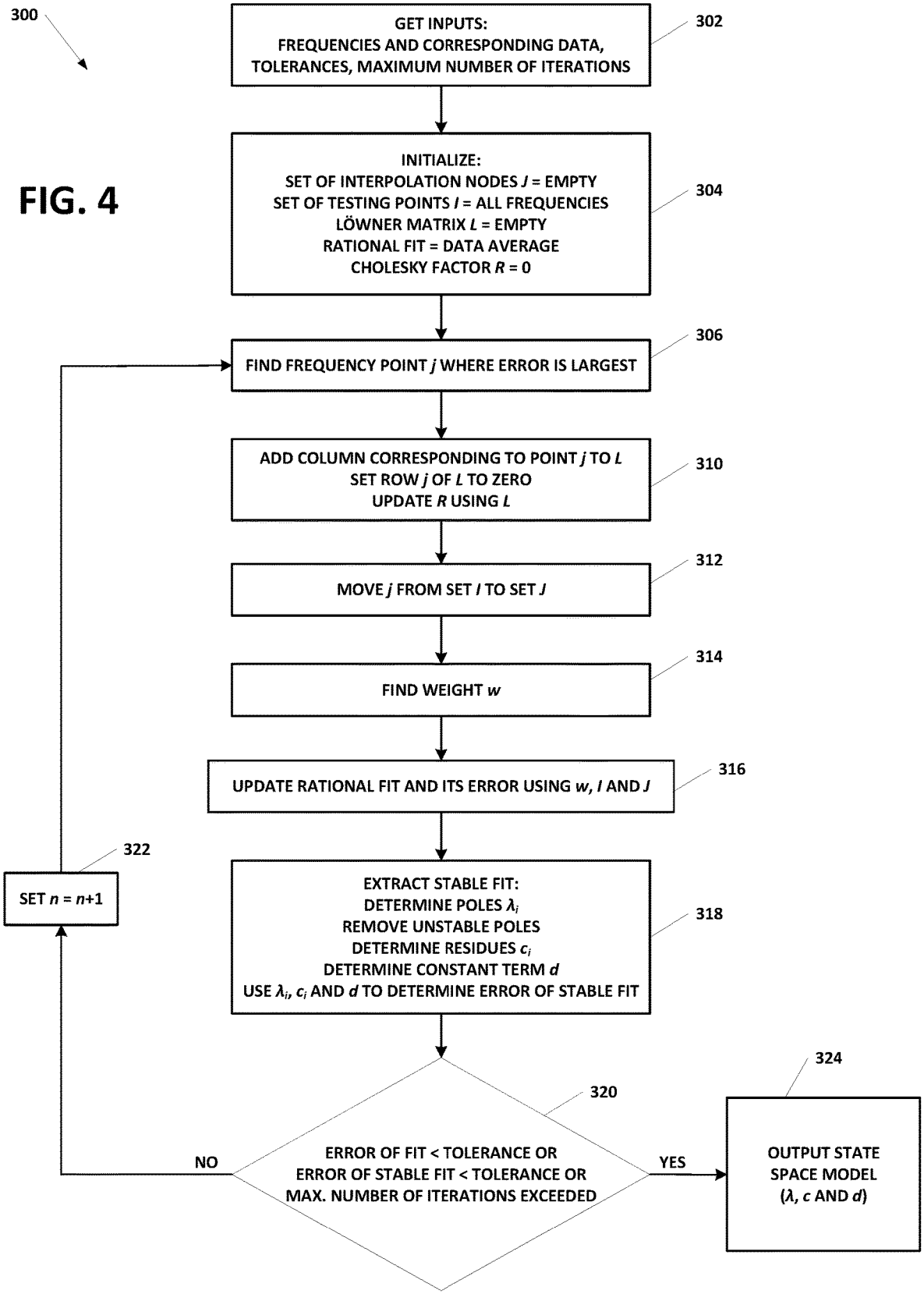
FIG. 4 is a flow diagram of an example method for generating a state space model.

FIG. 4 is a flow diagram of an example method 300 for generating a state space model based on rational function approximations. The method 300 may, for example, be utilized by the state space model generation engine depicted in FIGS. 1 and 2. At step 302, the method 300 acquires input data indicative of a physical system to be modeled, such as frequencies and corresponding data. The input data may also include configuration information, such as the maximum number of iterations to be performed, and a fitting-error tolerance.

At step 304, the model generation parameters are initialized. For example, utilizing the FASTFIT parameters described above, the set of interpolation nodes (J) may be initialized to empty, the set of testing points (I) may be initialized to all frequencies, the Löwner matrix (L) may be initialized to empty, the rational fit may be initialized to the data average, and the Cholesky factor (R) may be initialized to zero.

At step 306, the method 300 processes the input data to identify the frequency point (j) at which the current fitting error is the largest. Then, at step 310, two columns are added to a Löwner matrix ($L_H$) data structure, according to equation (24), corresponding to point j, and row j of the Löwner matrix ($L_H$) data structure is set to zero. A Cholesky factor (R) is then updated using the Löwner matrix ($L_H$), for example as described above under the heading "(f) Updating R."

At step 312, j is moved from a set of testing points (I) to a set of interpolation nodes (J).

At step 314, the method 300 determines the weight vector, w, based on the Cholesky factor (R), for example as described above under the heading "(e) Computing the Weight Vector from R."

At step 316, the rational fit and its error are updated using the weight vector w and the values with sets I and J. For example, the rational fit, r(s), may be determined using equation (1), and the error, $\epsilon_j$, may be determined using equation (2), as described above.

At step 318, a stable fit for the approximation is extracted, and the error associated with the stable fit is determined. To enforce the stability of the approximation, the poles Ai are determined and the unstable poles are removed (those with $\Re(\lambda_i)>0$), for example as described above under the heading "(g) Fast Computation of Poles." The residues, $c_i$, may be determined, for example using equation (13), and the constant term, d, may be determined, for example using equation (14), as described above. A stable rational-function fit is then given by $$r_{stable}(s) = \sum_i \frac{c_i}{s - \lambda_i} + d. \tag{28}$$

This form of the stable fit can then be used to determine its fitting error $\varepsilon_{stable}$, by the formula $$\varepsilon_{stable} = \max |r_{stable}(s_k) - f_k|, \forall k \in I \cup J. \tag{29}$$

At step 320, the method determines if either (1) the error of fit is less than a predetermined tolerance, (2) the error of stable fit is less than the predetermined tolerance, or (3) a maximum number of iterations has been exceeded. If any of these conditions are true, then the method proceeds to output the state space model at step 324 based on the calculated poles Ai, residues and constant term d. From these, a state-space model is obtained by use of equation (17). Otherwise, the value of n is iterated to n+1 at step 322, and the method returns to step 306.

In one alternative example, the method 300 depicted in FIG. 4 may operate without extracting a stable fit at step 318. In this example, the decision at step 320 may instead be based on the rational fit error, and the state space model output at step 324 may be generated based on the rational fit, r(s). Although extracting a stable fit is useful for generating models suitable for time-domain simulation, there are applications in which this step would be unnecessary. For example, in the simulation of RF systems, it is common to work entirely in the frequency domain, in which case models with unstable poles are acceptable.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 5, 6A, 6B and 6C.

FIG. 5 depicts at 400 a computer-implemented environment wherein users 402 can interact with a system 404 hosted on one or more servers 406 through a network 408. The system 404 contains software operations or routines. The users 402 can interact with the system 404 through a number of ways, such as over one or more networks 408. One or more servers 406 accessible through the network(s) 408 can host system 404. It should be understood that the system 404 could also be provided on a stand-alone computer for access by a user.

Figure 6A:
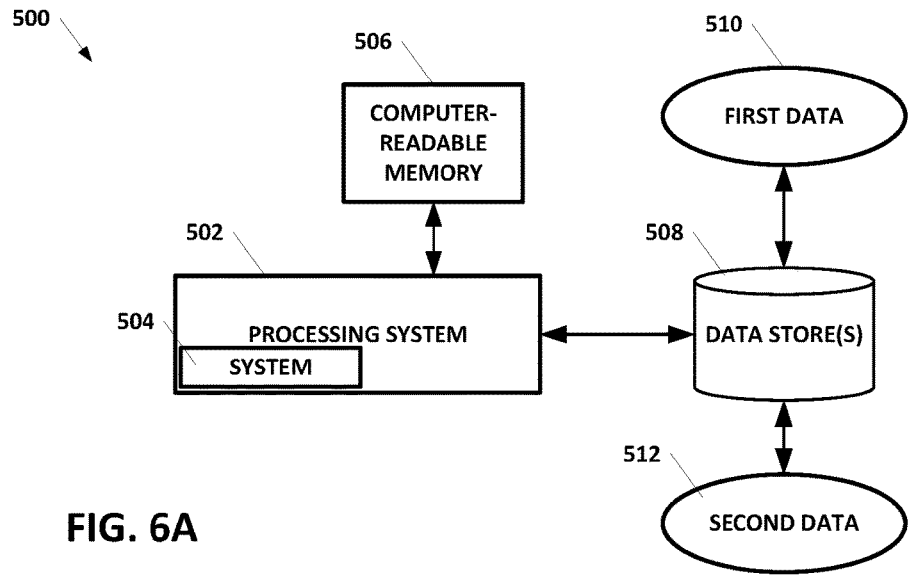
Figure 6B:
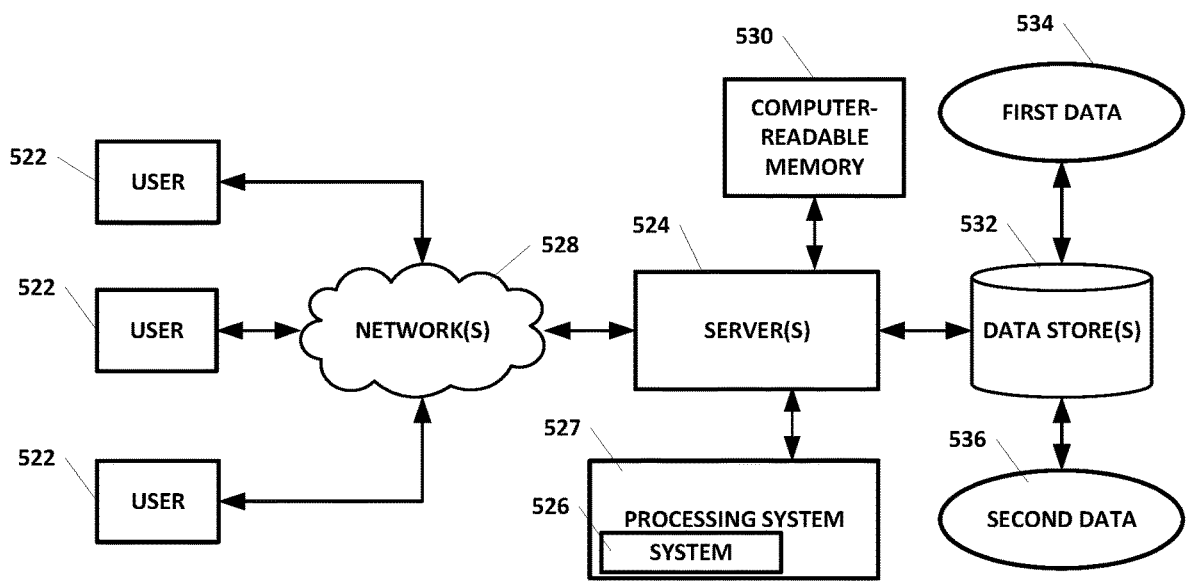

FIGS. 6A, 6B, and 6C depict example systems for use in implementing a system. For example, FIG. 6A depicts an exemplary system 500 that includes a standalone computer architecture where a processing system 502 (e.g., one or more computer processors) includes a system 504 being executed on it. The processing system 502 has access to a non-transitory computer-readable memory 506 in addition to one or more data stores 508. The one or more data stores 508 may contain first data 510 as well as second data 512.

FIG. 6B depicts a system 520 that includes a client server architecture. One or more user PCs 522 accesses one or more servers 524 running a system 526 on a processing system 527 via one or more networks 528. The one or more servers 524 may access a non-transitory computer readable memory 530 as well as one or more data stores 532. The one or more data stores 532 may contain first data 534 as well as second data 536.

FIG. 6C shows a block diagram of exemplary hardware for a standalone computer architecture 550, such as the architecture depicted in FIG. 6A, that may be used to contain and/or implement the program instructions of system embodiments of the present disclosure. A bus 552 may serve as the information highway interconnecting the other illustrated components of the hardware. A processing system 554 labeled CPU (central processing unit) (e.g., one or more computer processors), may perform calculations and logic operations required to execute a program. A non-transitory computer-readable storage medium, such as read only memory (ROM) 556 and random access memory (RAM) 558, may be in communication with the processing system 554 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 560 interfaces one or more disk drives to the system bus 552. These disk drives may be external or internal floppy disk drives such as 562, external or internal CD-ROM, CD-R, CD-RW or DVD drives such as 564, or external or internal hard drives 566.

Each of the element managers, real-time data buffer, conveyors, file input processor, database index shared access memory loader, reference data buffer and data managers may include a software application stored in one or more of the disk drives connected to the disk controller 560, the ROM 556 and/or the RAM 558. Preferably, the processor 554 may access each component as required.

A display interface 568 may permit information from the bus 556 to be displayed on a display 570 in audio, graphic, or alphanumeric formal. Communication with external devices may occur using various communication ports 578.

In addition to the standard computer-type components, the hardware may also include data input devices, such as a keyboard 572, or other input device 574, such as a microphone, remote control, pointer, mouse and/or joystick.

One embodiment of a computer-implemented method for generating a state space model of a physical system includes the following operations: identifying a frequency point in received input data at which a current fitting error is largest; adding a column to a matrix data structure based on the identified frequency point and setting a row of the matrix data structure to zero; determining a Cholesky factor using the matrix data structure; determining a weight vector based on the Cholesky factor; determining a rational-function fit based on the weight vector; removing one or more unstable poles from the rational-function fit to determine a stable rational-function fit; determining an error associated with the stable rational-function fit; if the error associated with the stable rational-function fit is less than a predetermined tolerance, then generating the state space model based on the stable rational-function fit; and if the error associated with the stable rational-function fit is not less than the predetermined threshold, then performing an additional iteration of the method.

One embodiment of a computer-implemented system for generating a state space model of a physical system includes: a processor; a non-transitory computer-readable medium; a state space model generation engine, stored in the non-transitory computer-readable medium and executable by the processor, the state space model generation engine being configured to: (a) identify a frequency point in received input data at which a current fitting error is largest; (b) add a column to a matrix data structure based on the identified frequency point and setting a row of the matrix data structure to zero; (c) determine a Cholesky factor using the matrix data structure; (d) determine a weight vector based on the Cholesky factor; (e) determine a rational-function fit based on the weight vector; (f) remove one or more unstable poles from the rational-function fit to determine a stable rational-function fit; (g) determine an error associated with the stable rational-function fit; (h) if the error associated with the stable rational-function fit is less than a predetermined tolerance, then generate the state space model based on the stable rational-function fit; and (i) if the error associated with the stable rational-function fit is not less than the predetermined threshold, then perform an additional iteration of operations (a)-(i).

Another embodiment of a computer-implemented system for generating a state space model of a physical system includes: a processor; a non-transitory computer-readable medium; a state space model generation engine, stored in the non-transitory computer-readable medium and executable by the processor, the state space model generation engine being configured to: (a) identify a frequency point in received input data at which a current fitting error is largest; (b) add a column to a matrix data structure based on the identified frequency point and setting a row of the matrix data structure to zero; (c) determine a Cholesky factor using the matrix data structure; (d) determine a weight vector based on the Cholesky factor; (e) determine a rational-function fit based on the weight vector; (f) determine an error associated with the rational-function fit; (g) if the error associated with the rational-function fit is less than a predetermined tolerance, then generate the state space model based on the rational-function fit; and (h) if the error associated with the rational-function fit is not less than the predetermined threshold, then perform an additional iteration of operations (a)-(h).

In embodiments, the received input data may include frequency-domain response data that is indicative of a response of one or more components of the physical system to a stimulus, and the state space model may be usable to simulate a time-domain response of the one or more components of the physical system.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The technology described herein may provide certain advantages over known systems, some of which are detailed herein. It should be understood, however, that other advantages, in addition to those expressly detailed herein, may also be possible.

It is claimed:

1. A computer-implemented method comprising:
   extracting data from a printed circuit board comprising s-parameter data;
   receiving input data based on the extracted data including a maximum number of iterations;
   identifying a frequency point in the received input data at which a current fitting error is largest;
   adding a column to a matrix data structure based on the identified frequency point and setting a row of the matrix data structure to zero;
   determining a Cholesky factor using the matrix data structure;
   determining a weight vector based on the Cholesky factor;
   determining a rational-function fit based on the weight vector;
   extracting a stable rational-function fit by removing one or more unstable poles from the rational-function fit;
   determining an error associated with the stable rational-function fit;
   if the error associated with the stable rational-function fit is less than a predetermined tolerance, then generating the state space model based on the stable rational-function fit;
   if the number of iterations has exceeded the maximum number of iterations, then generating the state space model based on the stable rational-function fit;
   if the error associated with the stable rational-function fit is not less than the predetermined threshold and the maximum number of iterations has not been exceeded, then performing an additional iteration of the method; and
   simulating, after the generation of the state space model, a time-domain response of one or more components of the printed circuit board using the generated state space model.

2. The method of claim 1, wherein the received input data includes frequency-domain response data that is indicative of a response of one or more components of the printed circuit board to a stimulus.

3. The method of claim 2, wherein the simulating the time-domain response of the one or more components of the printed circuit board is executed by a software-based simulator.

4. The method of claim 1, wherein the matrix data structure is a Löwner matrix data structure.

5. The method of claim 1, further comprising,
   determining poles, residues and a constant term based on the stable rational-function fit, wherein the state space model is generated based on the poles, residues and constant term.

6. The method of claim 1, wherein the input data includes measured system response data that is extracted from one or more physical tests or simulations of the printed circuit board.

7. The method of claim 1 further comprising:
   sending a control signal to a different electronic device based on output data generated by the simulation.

8. A computer-implemented system comprising:
   a processor;
   a non-transitory computer-readable medium;
   a state space model generation engine, stored in the non-transitory computer-readable medium and executable by the processor, the state space model generation engine being configured to:
   (a) identify a frequency point in received input data at which a current fitting error is largest, the received input data being from a printed circuit board and comprising s-parameter data;
   (b) add a column to a matrix data structure based on the identified frequency point and setting a row of the matrix data structure to zero;
   (c) determining a Cholesky factor using the matrix data structure;
   (d) determining a weight vector based on the Cholesky factor;
   (e) determine a rational-function fit based on the weight vector;
   (f) determine an error associated with the rational-function fit;
   (g) if the error associated with the rational-function fit is less than a predetermined tolerance, then generate the state space model based on the rational-function fit;
   (h) if the error associated with the rational-function fit is not less than the predetermined threshold and a maximum number of iterations has not been met, then perform an additional iteration of operations (a)-(h);
   (i) simulating behavior of a time-domain response of one or more components of the printed circuit board using the generated state space model;
   wherein, on each iteration, the Cholesky factor grows by two columns and shrinks by two rows to ensure Hermitian symmetry.

9. The system of claim 8, wherein the state space model generation engine is further configured to remove one or more unstable poles from the rational-function fit to determine a stable rational-function fit and determine an error associated with the stable rational-function fit, wherein the state space model is generated based on the stable rational-function fit.

10. The system of claim 9, wherein the state space model is generated if the error associated with the stable rational-function fit is less than the predetermined tolerance, and an additional iteration is performed if the error associated with the stable rational-function fit is not less than the predetermined threshold.

11. The system of claim 8, wherein the received input data includes frequency-domain response data that is indicative of a response of one or more components of the printed circuit board to a stimulus.

12. The system of claim 11, wherein the simulating the time-domain response of the one or more components of the printed circuit board is executed by a software-based simulator.

13. The system of claim 8, wherein the matrix data structure is a Löwner matrix data structure.

14. The system of claim 9, wherein the state space model generation system is further configured to determine poles, residues and a constant term based on the stable rational-function fit, wherein the state space model is generated based on the poles, residues and constant term.

15. The system of claim 8, wherein the input data includes measured system response data that is extracted from one or more physical tests or simulations of the printed circuit board.

16. A system comprising:
one or more processors;
one or more non-transitory computer-readable medium;
a physical system data structure, stored in the one or more non-transitory computer-readable medium, wherein the physical system data structure includes frequency-domain response data that is indicative of a response of one or more components of a physical system to a stimulus, the frequency-domain response data being derived from a printed circuit board comprising s-parameter data; and
a state space model generation engine, stored in the one or more non-transitory computer-readable medium and executable by the one or more processors to generate the state space model based on the frequency-domain response data, wherein the state space model is usable to simulate a time-domain response of the one or more components of the physical system,
the state space model generation engine being configured to:
(a) identify a frequency point in the frequency-domain response data at which a current fitting error is largest;
(b) add a column to a matrix data structure based on the identified frequency point and setting a row of the matrix data structure to zero;
(c) determining a Cholesky factor using the matrix data structure;
(d) determining a weight vector based on the Cholesky factor;
(e) determine a rational-function fit based on the weight vector;
(f) extract a stable rational-function fit by removing one or more unstable poles from the rational-function fit;
(g) determine an error associated with the stable rational-function fit;
(h) if the error associated with the stable rational-function fit is less than a predetermined tolerance, then generate the state space model based on the stable rational-function fit;
(i) if a maximum number of iterations has been exceeded, then generate the state space model based on the stable rational-function fit
(j) if the error associated with the stable rational-function fit is not less than the predetermined threshold and the maximum number of iterations has not been exceeded, then perform an additional iteration of operations (a)-(i); and
(k) simulate behavior of a time-domain response of one or more components of the printed circuit board using the generated state space model;
wherein, on each iteration, the Cholesky factor grows by two columns and shrinks by two rows to ensure Hermitian symmetry.

17. The system of claim 16, further comprising:
a simulator, stored in the one or more non-transitory computer-readable medium and executable by the one or more processors to use the state space model to simulate the time-domain response of the one or more components of the printed circuit board.

18. The system of claim 16, wherein the matrix data structure is a Löwner matrix data structure.

19. The system of claim 16, wherein the state space model generation system is further configured to determine poles, residues and a constant term based on the stable rational-function fit, wherein the state space model is generated based on the poles, residues and constant term.

20. The system of claim 16, wherein the frequency-domain response data includes measured system response data that is extracted from one or more physical tests of the printed circuit board.

* * * * *